United States Patent
Komiya

(10) Patent No.: US 6,773,297 B2
(45) Date of Patent: Aug. 10, 2004

(54) CLOSED CABLE DRAG CHAIN

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/301,963

(22) Filed: Nov. 22, 2002

(65) Prior Publication Data

US 2003/0109168 A1 Jun. 12, 2003

(30) Foreign Application Priority Data

Dec. 11, 2001 (JP) ........................................ 2001-377830

(51) Int. Cl.⁷ .............................................. H01R 13/56
(52) U.S. Cl. ....................... 439/445; 138/120; 285/223; 174/69
(58) Field of Search ................................ 439/445, 446; 174/69, 68.3; 138/118, 120; 285/223, 22; 59/78.1, 84, 85, 79.3

(56) References Cited

U.S. PATENT DOCUMENTS

| | | | |
|---|---|---|---|
| 4,672,805 A | * 6/1987 | Moritz | 59/78.1 |
| 4,834,594 A | 5/1989 | Morgan | |
| 5,197,767 A | * 3/1993 | Kimura et al. | 285/39 |
| 5,215,338 A | * 6/1993 | Kimura et al. | 285/154.2 |
| 5,839,476 A | * 11/1998 | Blase | 138/120 |
| 5,933,557 A | * 8/1999 | Ott | 385/86 |
| 6,039,081 A | * 3/2000 | Albert | 138/120 |
| 6,575,654 B2 | * 6/2003 | Wentworth et al. | 403/56 |
| 6,578,350 B2 | * 6/2003 | Blase et al. | 59/78.1 |

FOREIGN PATENT DOCUMENTS

| | | |
|---|---|---|
| DE | G 91 09 422.4 | 10/1991 |
| DE | G 93 18 441.7 | 2/1994 |
| JP | (Sho) 62-15008 | 4/1987 |
| JP | 2002-089632 | 3/2002 |

OTHER PUBLICATIONS

European Search Report EP 02 02 5995, Jun. 2003.

* cited by examiner

Primary Examiner—Tulsidas C. Patel
(74) Attorney, Agent, or Firm—Woodling, Krost and Rust

(57) ABSTRACT

To provide a closed cable drag chain, which is capable of preventing the contact wear powder generated in holding and guiding the cable or the like from being scattered by reliably closing the cable or the like, and wherein the assembling, maintenance and repair are easy while having light weight and low noise. In a closed cable drag chain into which a cable or the like is inserted to be held and guided in conditions where a number of intermediate frames (10) are articulately connected to each other, an outer frame (20) including a removable opening/closing frame structure fit-covers a coupling portion of the adjacent intermediate frames (10) to close the coupling gaps S respectively thereby coupling it in a tubular shape, the intermediate frame (10) comprises an intermediate frame body and an opening/closing lid member (12) fitted into the intermediate frame body (11), and the intermediate frame body (11) includes lower open end surfaces (11b), which abut with each other on the chain bend inner peripheral side to hold a required bending position of the chain and upper open end surfaces (11c), which abut with each other on the chain bend outer peripheral side to hold a straight extended position of the chain.

7 Claims, 5 Drawing Sheets ically and a half body of the tube member is sandwiched by the halves of the tube members from the upper and lower portions. Then by engaging the inner groove in the small diameter tube member and a stopper of the upper and lower halves of the tube members the support device has a structure connected in the longitudinal direction of the support device.

CLOSED CABLE DRAG CHAIN

FIELD OF THE INVENTION

The present invention relates to a technical field of a cable drag chain, which holds and guides an electric cable or a hydraulic or pneumatic hose between a mobile portion where a machine tool, a civil engineering machinery, a transfer system or the like is moved and a fixed portion.

RELATED ART

When a cable or a hydraulic or pneumatic hose is connected to a mobile device such as a machine tool, a civil engineering machinery, a transfer system or the like, undue torsion or tension is generated in the cable or hose by its movement thereby damaging a cable or a hose and disordering its outward appearance. Therefore, a cable drag chain for holding and guiding the cable or hose has been proposed.

A support device for a cable or a hose, which was proposed in Japanese Examined Patent Publication No. Sho. 62-15008 for example, includes a plastic small-diameter tube member provided with a fan-shaped groove in upward and downward directions of an outer peripheral surface of its side, inside the support device, and also includes a half body of the tube member made of a metallic sheet up and down respectively on the inside the support device, and the halves of the tube members are attached to each other with a pin in such a manner that said small diameter tube member is sandwiched by the halves of the tube members from the upper and lower portions. Then by engaging the inner groove in the small diameter tube member and a stopper of the upper and lower halves of the tube members the support device has a structure connected in the longitudinal direction of the support device.

A cable drag chain "A" disclosed in the specification of Japanese Patent Application No. 2000-278471 previously filed by the present inventor includes a pair of connector pins A34 and pin hole portions A35 at a front end portion A32 and a rear end portion A33 in a plurality of tubular intermediate frames A3 respectively as shown in FIGS. 4 and 5. Then, the end surface of each of the front and rear end portions A32 and A33 is formed as a stopper surface, which limits a bending angle, and the connector pin portion A34 and the pin hole portion A35 of the adjacent intermediate frame A3 are engaged to each other thereby connecting a plurality of intermediate frames A3. At the same time an outer periphery of the connected portion of the adjacent intermediate frame A3 is covered with a detachable tubular outer frame A4 to close a gap between the adjacent intermediate frames A3.

Problems to be Solved by the Invention

However, when the pin for engagement in the former support device for the cable or hose is removed, the upper and lower tube member halves and the small diameter tube member are taken apart in pieces and they are disconnected at the disassembled portion. Thus, assembling them to the original structure is troublesome. Further, there are problems that after the upper and lower tube member halves and the small diameter member are assembled once, it takes much time to disassemble them and when they are assembled again, a pin must be replaced with a new one, thereby increasing the cost and becoming inconvenient for maintenance.

Further, there are problems that since the upper and lower tubular member halves are made of a metallic material and the small tube member are molded of a synthetic resin, the metallic material shaves the synthetic resin during sliding and a large amount of wear powder is produced. Further, since the metallic material is used the holding device becomes heavier than that molded of only a synthetic resin. Additionally since a portion of a metallic material and a portion of a synthetic resin collide with each other during moving the support device, a high noise is generated. Furthermore, since the upper and lower tube member halves on the outermost periphery is made of metal the noise that the upper frame hits a floor surface during the movement of the device becomes higher.

On the other hand, in the latter cable drag chain A an intermediate frame A3 is formed by a thick hollow rectangular tube body of a synthetic resin and there is a troublesome problem that the cable or the hose cannot be inserted during maintenance and repair as shown in FIG. 5(a). Further, as shown in FIG. 5(b) a thin tongue piece A47 provided on the outer frame A4 is engaged in a groove portion A36 provided on the outer peripheral surface of the intermediate frame A3 to close the gap of the connecting portion. However, the thin tongue piece A47 makes the contact conditions with the intermediate frame A3 insufficient and the sealing degree cannot be exerted sufficiently.

Therefore, the objects of the present invention is to solve the above-mentioned problems and to provide a closed cable drag chain, which is capable of preventing the contact wear powder generated in the holding and guiding the cable or the like from being scattered by reliably closing the cable or the like, and wherein the assembling, maintenance and repair are easy while having light weight and low noise.

Means for Solving the Problems

To solve the above-mentioned problems a closed cable drag chain according to claim 1, into which a cable or the like is inserted to be held and guided in conditions where a number of intermediate frames are articulately connected to each other, an outer frame including a removable opening/closing frame structure fit-covers a coupled portion of the adjacent intermediate frames to close the coupling gaps respectively thereby engaging it in a tubular shape is characterized in that said intermediate frame comprises an intermediate frame body in which a cable holding groove was provided and an opening/closing lid member fitted into said cable holding groove, and said intermediate frame body includes lower open end surfaces, which abut with each other on the chain bend inner peripheral side to hold a required bending position of the chain and upper open end surfaces, which abut with each other on the chain bend outer peripheral side to hold a straightly extended position of the chain.

A closed cable drag chain according to claim 2 further solves the above-mentioned problems by that fact that an elastic sealed portion, which closely fits said outer frame and said intermediate frame are formed on the inside of the front end and the inside of the rear end of the outer frame in addition to the configuration of claim 1.

Further, a closed cable drag chain according to claims 3 and 4 further solves the above-mentioned problems by the fact that said outer frame is relatively movably connected to said opening/closing lid member while including an engagement piece, which is movably engaged in an engagement portion protruded on the opening/closing lid member in the coupling direction of the chain in addition to the configuration according to claim 1 or 2.

Further, a closed cable drag chain according to claims 5, 6, 7 and 8 further solves the above-mentioned problems by the fact that said intermediate frame and outer frame are formed of a synthetic resin in addition to the configuration according to claims 1 to 4.

Here, the intermediate frame used in the present invention comprises an intermediate frame body in which a cable holding groove is provided and an opening/closing lid member, which is fitted into said cable holding groove. If the intermediate frames forms a tubular coupling structure in which they were articulately connected to each other and has a form in which a cable or the like is inserted and can be held and guided, any annular forms having cross-sections such as a circular cross-section, an oval cross-section, a rectangular cross-section and the like may be used.

Further a number of intermediate frames in the present invention may be used if they are articulately connected to each other in a coupling structure. As the concrete connection structures a connecting structure in which connecting pin portions of the adjacent frames and the pin hole portions of the adjacent intermediate frames were fitted to each other, a connecting structure in which the pin hole portions of the adjacent intermediate frames were connected to a connecting pin of another part or the like can be adopted.

On the other hand, if the opening/closing frame structure of said outer frame can be removed from the coupling portion of the adjacent intermediate frames, any of the opening/closing frame structures, which can be split or opened/closed up and down or left and right, may be used. Further, if an opening/closing mechanism including a snap locking portion on one hand and including a hinge portion on the other hand is adopted, a simple opening/closing operation can be attained.

Further, if the elastic sealed portion formed inside the front end and inside the rear end of said outer frame can closely fits the outer frame and the intermediate frame, even a sealing form integrally molded by a multi-components injection molding process may be used and a sealing form in which an elastic sealing member was adhered with adhesive or the like may also be used.

If the engagement structure of the engagement piece formed on said outer frame and the engagement portion protruded on the opening/closing lid member is a structure that can relatively movably connect the outer frame to the opening/closing lid member, any engagement structure may be used. Even if, for example, said engagement structure is one in which the engagement portion is formed of a stopping projection and an engagement hole, which is movably engaged with this stopping projection in the coupling direction, is provided in an engagement piece, it may be used.

If the materials of the intermediate frame and the outer frame are synthetic resin, any material may be used. Nevertheless, synthetic resins such as acryl so called as engineering plastics having excellent wear resistance and lubricating properties, polycarbonate, nylon 6, nylon 66, nylon 46, all aromatic nylons and the like are preferably used. Further, when strength is required, fiber reinforced plastics is preferred.

Action

When a mobile machine such as a machine tool, an electronic device, a civil engineering machinery, a transfer system or the like, or a cable or the like such as an electric cable, which performs electrical supply, liquid supply or the like to a mobile portion of a machine, a hydraulic or pneumatic hose or the like is moved together with the mobile portion, the closed cable drag chain according to the present invention sequentially causes portions exhibiting required bending positions of a number of adjacent intermediate frames coupled in a tubular shape to sequentially displace in accordance with the mobile positions of mobile portions while lower open end surfaces formed on the intermediate frame bodies of the intermediate frames abut on each other on a chain bend inner peripheral side thereby ensuring a required bending radius, whereby the cable or the like can be moved together with the mobile portion of the machine while being held and guided.

Further, upper open end surfaces formed on the intermediate frame bodies of the intermediate frames abut on each other on a chain bend outer peripheral side at mobile positions where said adjacent intermediate frames do not require a required bending position, whereby the drag chain allows the cable or the like to be inserted and held while maintaining a straightly extended position.

A better understanding of the invention will be had when reference is made to the Brief Description of the Drawings, Description of the Invention and claims which follow hereinbelow.

Figure 1:
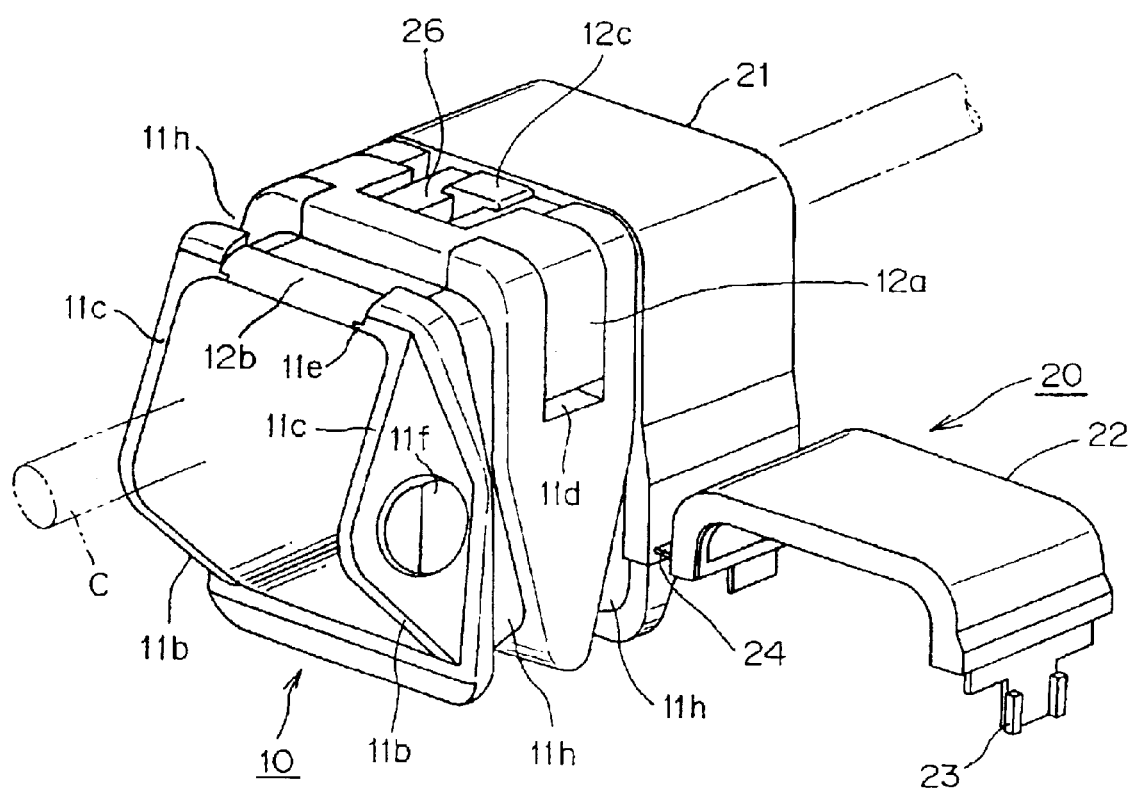
FIG. 1 is an enlarged perspective view of a configuration unit of a closed cable drag chain, which is an Example of the present invention.

A better understanding of the invention will be had when reference is made to the Description of the Invention and claims which follow hereinbelow.

DESCRIPTION OF THE INVENTION

Description of Reference Numerals

10 . . . Intermediate frame
11 . . . Intermediate frame body
11$a$ . . . Cable holding groove
11$b$ . . . Lower open end surface
11$c$ . . . Upper open end surface
11$d$ . . . Side wall engagement portion
11$e$ . . . Step portion
11$f$ . . . Connecting pin portion
11$g$ . . . Pin hole portion
11$h$ . . . Fitting groove
12 . . . Opening/closing lid member
12$a$ . . . Locking arm
12$b$ . . . Bend limiting end portion
12$c$ . . . Engagement portion
20 . . . Outer frame
21 . . . Upper outer frame
22 . . . Lower outer frame
23 . . . Snap locking portion
24 . . . Hinge portion 25 . . . Elastic sealed portion
26 . . . Engagement piece
26a . . . Engagement hole
C . . . Cable or the like
S . . . Coup ling gap Embodiments of the Invention One Example of a closed cable drag chain preferable as the present invention will be described with reference to FIGS. 1 and 3. FIG. 1 is an enlarged perspective view of a configuration unit of a closed cable drag chain, which is one Example of the present invention, FIG. 2 is a disassembled view of the configuration unit shown in FIG. 1 and FIG. 3 is a side view of a closed cable drag chain formed by connecting the configuration units shown in FIG. 1 to each other.

Figure 2:
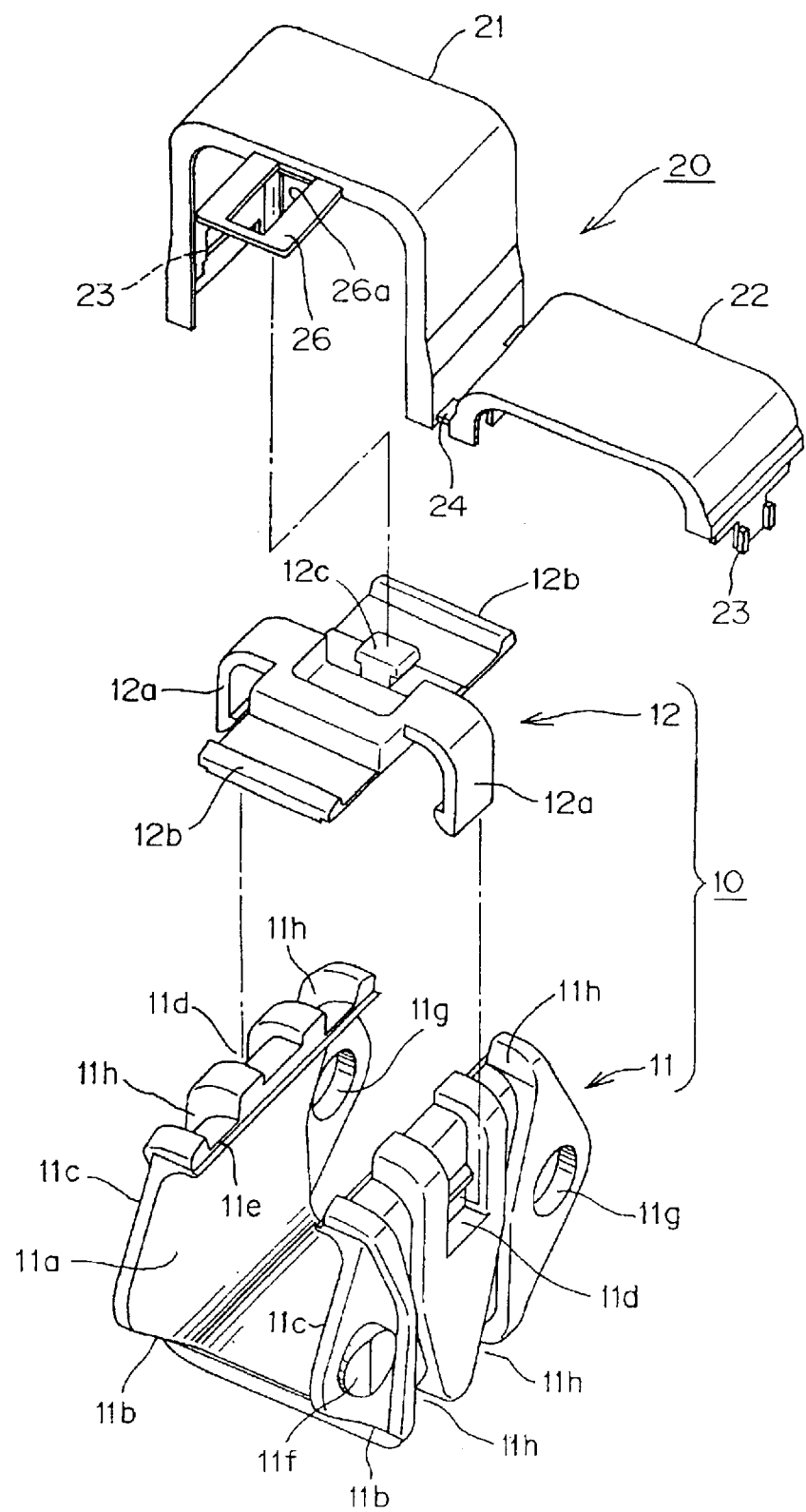
FIG. 2 is a disassembled view of the configuration unit shown in FIG. 1.
Figure 3:
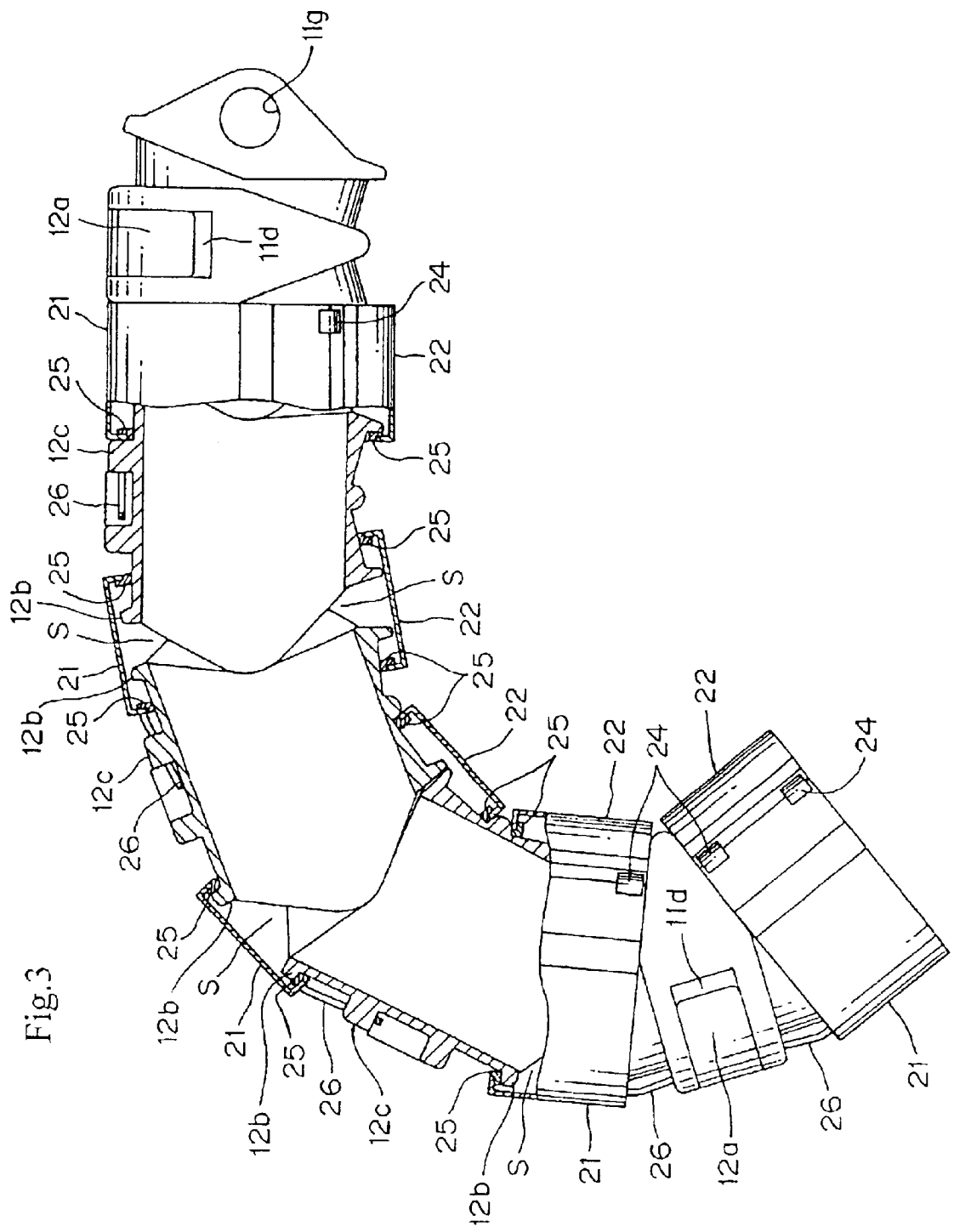
FIG. 3 is a side view of a closed cable drag chain in which a plurality of the configuration units shown in FIG. 1 was coupled with each other.
Figure 4:
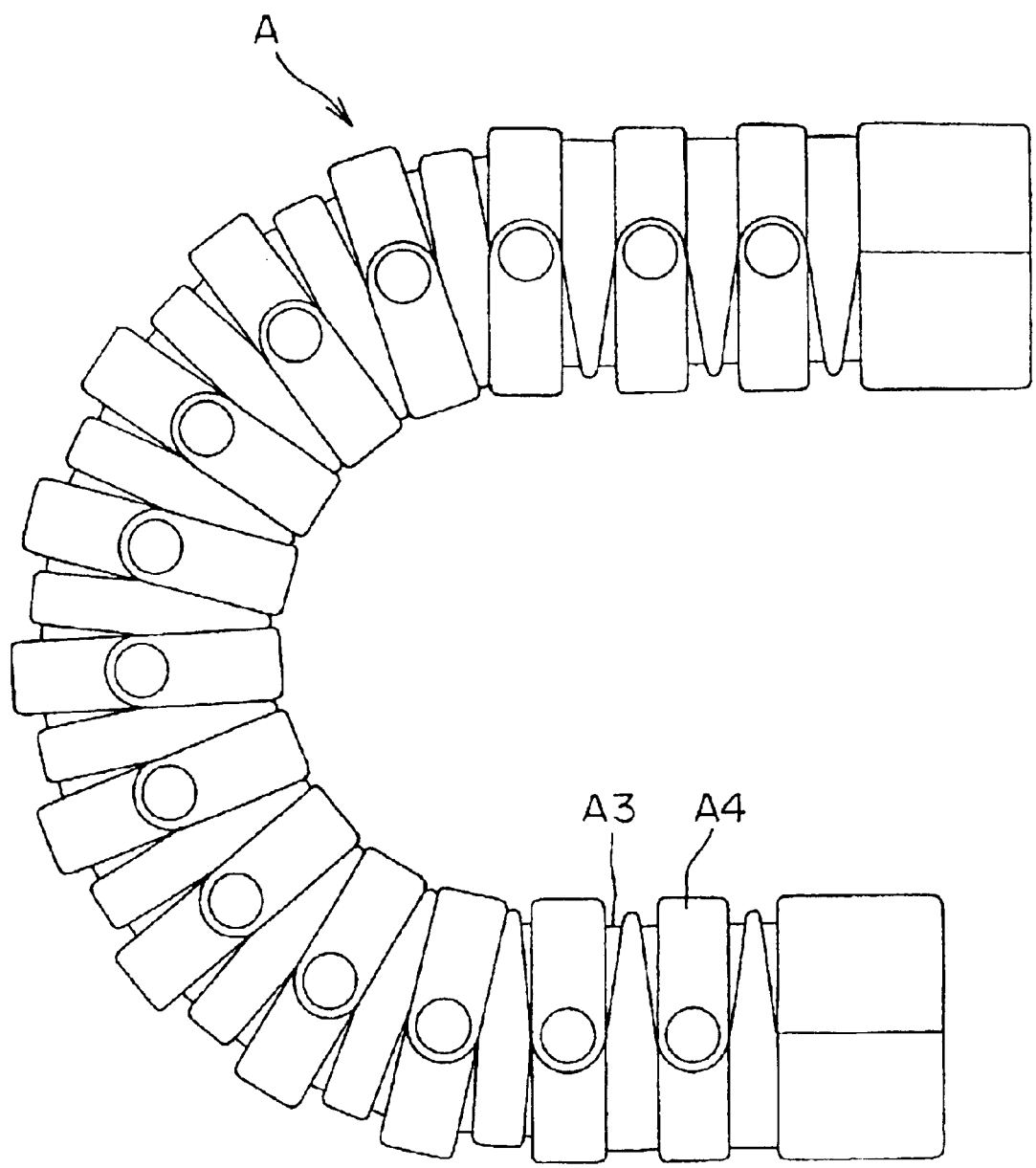
FIG. 4 is a side view showing a conventional cable drag chain.
Figure 5A:
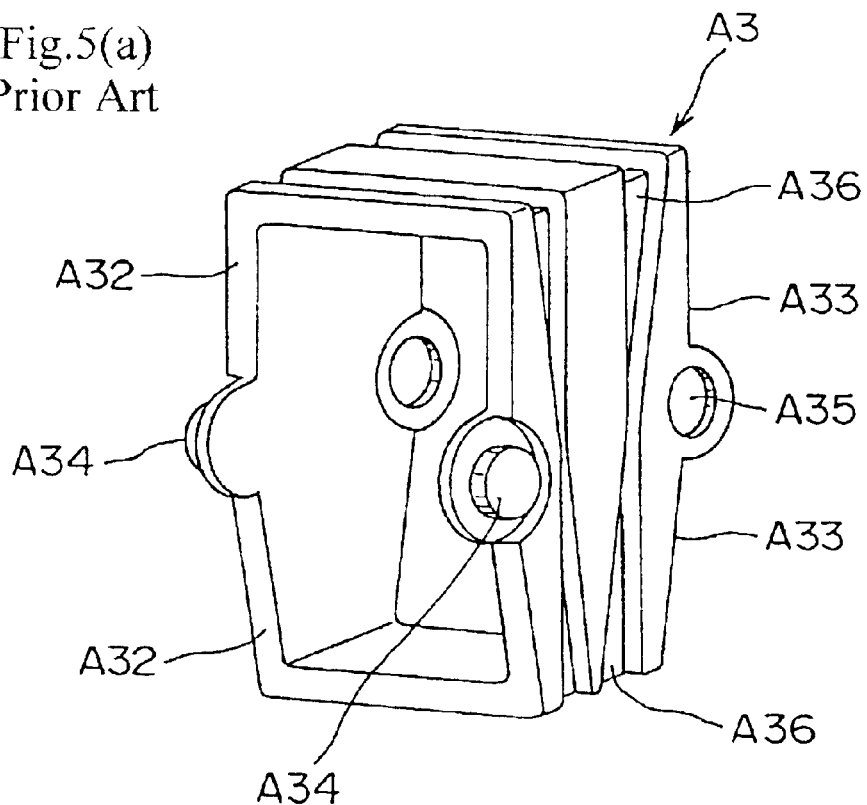
FIG. 5 is a view of components of the cable drag chain shown in FIG. 4, and particularly, (a) is a perspective view of an intermediate frame and (b) is a perspective view of an outer frame.
Figure 5B:
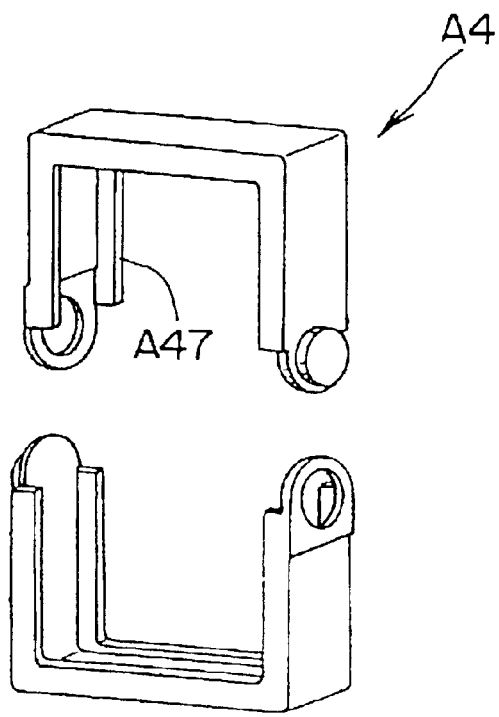

The closed cable drag chain of the present Example is formed by connecting a number of configuration units to each other as shown in FIGS. 1 and 2 to a tubular form. More specifically, as shown in FIG. 3, a number of intermediate frames 10 made of a synthetic resin are articulately connected to each other to form a coupled tube and by fit-covering a coupling portion between the intermediate frames with an outer frame 20 made of a synthetic resin to close coupling gaps S respectively a basic structure in which the cable or the like C are inserted, held and guided is included.

Thus the intermediate frame 10 of the synthetic resin of the present Example comprises an intermediate frame body 11 in which a cable holding groove 11a for inserting the cable or the like C therein was provided and an opening/closing lid member 12 which is fitted into the cable holding groove 11a as shown in FIG. 2. The frame form is an annular form having a rectangular cross-section.

Further, the intermediate body 11 includes a lower open end surface 11b which holds a required bent position by abutting therewith on a bent inner peripheral side of the chain and an upper open end surface 11c which holds a straightly extended position by abutting therewith on a bent outer peripheral side of the chain.

The opening/closing lid member 12, which is fitted into said cable holding groove 11a, is elastically engaged in opposite side wall engagement portions 11d and 11d by reversed-U-shaped locking arms 12a and 12a extending on both sides and exerting spring plate effects inwardly, and is fitted in opposed step portions 11e each provided on the upper end of the cable holding groove 11a so that the flowing out of contact wear powder generated within the cable holding groove 11a from the coupling portion is prevented.

Further, said opening/closing lid member 12 includes a bend-limiting portion 12b, which abuts on a chain on the chain bending outer peripheral side as well as the upper open end surface 11c formed on the intermediate body 11 of the intermediate frame 10 to helpfully limit the bending of the chain so that it can maintain the straight extended position, at a mobile position where a required bending position is not needed.

Further, said intermediate frames 10 can be articulately connected to each other to be coupled to a tubular structure by adopting a connected structure wherein connector pin portions 11f protruded on the intermediate frame body 11 and the adjacent pin hole portions 11g bored in the intermediate frame body 11 are fitted to each other, whereby assembling and disassembling a drag chain can be easily performed without using another part of the connector pin. However, a connected structure in which the adjacent pin hole portions bored in the intermediate frame portions 11 were reliably connected to each other with another part of a connecting pin may be adopted.

The outer periphery of said intermediate frame 10 is provided with fitting grooves 11h, which are fitted to and covered by the outer frame 20 at coupling portions between adjacent intermediate frames 10 to close the coupling gaps S respectively.

On the other hand, an outer frame 20 made of a synthetic resin of the present Example includes an opening/closing frame structure comprising an upper side outer frame 21 and a lower side outer frame 22, both of which can be disassembled from a coupling portion between the adjacent intermediate frames 10, and adopts a integral piece type frame which is split to open in the up and down directions at a snap locking portion 23 provided on one end, where these upper side outer frame 21 and lower side outer frame 22 are connected to each other, and at a hinge portion 24 provided on the other end.

It is noted that as the outer frame 20 of a synthetic resin of the present Example an integral type outer frame which can be split to open itself left and right by including an opening/closing structure comprising a right outer frame and a left outer frame may be adopted.

An elastic sealed portion 25 is formed by adhering an elastic sealing material to the inside of the front end of said outer frame 20 and the inside of the rear end thereof so that the closed fitting of the intermediate frame 10 can be performed even in any bent conditions and the sealing degree between the intermediate frame 10 and the outer frame 20 is improved. Thus, the diffusion of dust such as contact wear powder generated on holding and guiding the cable or the like C is reliably blocked and sliding noise and contact noise, which are likely to occur between the intermediate frame 10 and the outer frame 20, are absorbed.

Although in the present Example said elastic sealed portions 25 are provided on the inside of the front end and the inside of the rear end of the outer frame 20, if the elastic sealed portions 25 are extended between the inside of the front end and the outside of the front end of the outer frame 20 and between the inside of the rear end and the outside of the rear end of the outer frame 20, respectively, the sealing degree between the intermediate frame 10 and the outer frame 20 is further improved whereby the above-mentioned diffusion of the dust and sliding noise and the like can be more efficiently removed. Further, if the outer frame 20 is produced in a slightly smaller size than a size of the outward form of the intermediate frame, the sealing degree can be improved by the use of elastic deformation of the synthetic resin and the collision speed of the adjacent intermediate frames 10 is reduced to lower the collision noise by sliding resistance between the synthetic resins generated on bending of the intermediate frame 10.

Further, a tongue-shaped engagement piece 26 having a bored engagement hole 26a is provided in said outer frame 20 so that it is movably engaged in the opening/closing lid member 12 in an engagement direction of the engagement piece 26. Further, the engagement hole 26a of the engagement piece 26 is relatively movably connected to an engagement portion 12c comprising a stopping protrusion protruded on the opening/closing member 12.

As described above, the sliding resistance generated on the intermediate frame body 11 reduces the collision speed of the adjacent intermediate frame bodies 11 whereby these collision noises can be lowered. Additionally, the engagement piece 26 of the outer frame 20 is integrally connected to the engagement portion 12c of the opening/closing member 12. Thus, when the opening/closing member 12 is removed from the intermediate frame body 11, even if an upper outer frame 21 of the upper frame 20 and a lower outer frame thereof are being opened, the parts loss of the outer frame 10 and the opening/closing member 12 can be prevented during the maintenance by the integral form of the outer frame 20 and the opening/closing member 12 of the intermediate frame 10.

Next, the basic chain operation of the closed cable drag chain according to the present Example is as follows.

When a mobile portion in a machine tool as well as a cable or the like such as a cable, a hydraulic hose or the like are moved, the position exhibiting a required bending position of a number of intermediate frames engaged in a tubular shape is sequentially displaced in accordance with the movement position of the moving portion while the lower open end surfaces 11b provided on the intermediate frame body 11 of the intermediate frame 10 mutually ensure a required bending radius, whereby the cable or the like C as well as the moving portion of the machine tool can be moved while being held and guided in the closed cable drag chain of the present Example.

Further, the upper opened end portion 11c formed in the intermediate frame body 11 of the intermediate frame 10 and the bend limiting end portion 12b of the opening/closing lid member 12 inserts the cable or the like C to hold it while abutting with the chain on the respective chain bending outer peripheral side and maintaining the straight extended position at a moving position where the adjacent frames 10 do not require a required bending position.

The thus obtained closed cable drag chain of the present Example can remove the intermediate frame 20 and open/close the opening/closing lid member 12 without disassembling the engagement of the adjacent intermediate frames 10 by including the above-mentioned chain structure. Thus, the assembling of the chain in inserting a cable or the like C in the chain and maintenance and repair not only become easy but also the diffusion of the contact wear powder, which is likely to occur in holding and guiding the cable or the like C can be reliably prevented and the sliding noise and contact noise, which are generated between members, and the collision noise, which is generated between the adjacent intermediate bodies 11, as well as the hitting noise, which is generated in hitting the moving surface of the cable can be removed. Furthermore, weight reduction of the chain and cost reduction can be realized resulting in significant effects.

It is of course that the present invention is not limited to the above-described Examples if the features of the present invention are not lost, and for example, the intermediate frame 10 and the outer frame 20 may use any forms other than those described above.

EFFECTS OF THE INVENTION

As described above, according to the closed cable drag chain according to the invention, the intermediate frame comprises an intermediate frame body in which a cable holding groove was provided and an opening/closing lid member fitted into said cable holding groove, and the outer frame includes an opening/closing frame structure removable from the coupling portion of the adjacent intermediate frames. Thus, the opening/closing lid member can be freely opened/closed at an upper position of the intermediate frame body without simultaneously operating the coupling of the adjacent intermediate frames and the mounting/dismounting of the outer frame unlike conventional cases. Therefore, even after the drag chain was attached to a mobile machine such as a machine tool, an electronic device, a civil engineering machinery, a transfer system or the like, a cable or the like can be easily inserted into the drag chain to assemble it. As a result the cable or the like in a cable holding groove can be easily checked and repaired during its maintenance.

Further, according to the invention, the intermediate frame includes lower open end surfaces, which abut with each other on the chain bend inner peripheral side to hold a required bending position of the chain and upper open end surface, which abut with each other on the chain bend outer peripheral side to hold a straightly extended position of the chain. Thus, when a cable or the like is caused to move together with a mobile portion of a machine, lower open end surfaces of the intermediate frame body sequentially displace a portion exhibiting a required bending position while mutually ensuring a required bending radius whereby the cable or the like can be reliably guided and moved. Further, in a mobile position where the adjacent intermediate frames do not need a required bending position, the inserted state of the cable or the like in the chain can be stabilized and held while the upper open end surface formed in the intermediate body of the intermediate frame maintains a straightly extended position.

Further according to the closed cable drag chain of the invention the sealing degree between the outer frame and the intermediate frame is improved by the fact that an elastic sealed portion, which closely fits the outer frame and the intermediate frame are formed on the inside of the front end and the inside of the rear end of the outer frame. Thus, the diffusion of contact wear powder generated during holding and guiding the cable or the like can be reliably prevented so that one reason of dust generation in an operational environment can be removed. Additionally, when the cable or the like is moved together with a mobile portion of a machine, sliding noises or contact noises, which are likely to occur between the outer frame and the intermediate frame are absorbed, whereby noises in the operational environment can be further decreased.

Further according to the closed cable drag chain according of the invention, sliding resistance is generated in the intermediate frame body and the collision speed of the adjacent intermediate frame bodies are decreased by the fact the outer frame is relatively movably connected to the opening/closing lid member while including an engagement piece, which is movably engaged in an engagement portion protruded on the opening/closing lid member in the coupling direction of the chain. Thus, these collision noises can be reduced. Furthermore, the engagement piece in the outer frame and the engagement portion in the opening/closing lid member are integrally connected to each other. Therefore, even if the upper outer flame and the lower outer frame of the outer frame are opened when the opening/closing lid member is removed from the intermediate frame body, the parts loss of the outer frame and the opening/closing lid member in the intermediate frame can be prevented during maintenance by the integral state of the outer frame and the opening/closing lid member.

Further according to the closed cable drag chain of the invention, a generation amount of wear powder generated by the bending slide of the intermediate frame and the outer is reduced by the fact that the intermediate frame and outer frame are formed of a synthetic resin. Further, according to the invention, the collision noises generated between the intermediate frame and the outer frame during movement and hitting noises generated by hitting a moving surface of the cable can be decreased and weight reduction and cost reduction can be realized.

The invention has been described herein by way of example only and those skilled in the art will readily recognize that changes may be made to the invention as described herein without departing from the spirit and scope of the claims which follow hereinbelow.

I claim:

1. A closed cable drag chain into which a cable is inserted to be held and guided, comprising, a number of intermediate frames articulately connected to each other, an outer frame including a removable opening/closing frame structures each of which fit-covers a coupled portion of the adjacent intermediate frames to close the coupling gaps respectively thereby engaging it in a tubular shape, elastic sealed portions which closely fit said outer frame and said intermediate frame are formed on the inside of the front end and the inside of the rear end of each of said outer frame structures, said intermediate frames each comprises an intermediate frame body in which a cable holding groove is provided and an opening/closing lid member fitted into said cable holding groove, and, said intermediate frame body includes lower open end surfaces which abut with each other on the chain bend inner peripheral side to hold a required bending position of the chain and upper open end surfaces which abut with each other on the chain bend outer peripheral side to hold a straight extended position of the chain.

2. A closed cable drag chain according to claim 1 wherein said outer frame is relatively movably connected to said opening/closing lid member while including an engagement piece which is movably engaged in an engagement portion protruded on the opening/closing lid member in the coupling direction of the chain.

3. A closed cable drag chain according to claim 1 wherein said outer frame is relatively movably connected to said opening/closing lid member while including an engagement piece which is movably engaged in an engagement portion protruded on the opening/closing lid member in the coupling direction of the chain.

4. A closed cable drag chain according to claim 1 wherein said intermediate frame and outer frame are formed of a synthetic resin.

5. A closed cable drag chain according to claim 1 wherein said intermediate frame and outer frame are formed of a synthetic resin.

6. A closed cable drag chain according to claim 2 wherein said intermediate frame and outer frame are formed of a synthetic resin.

7. A closed cable drag chain according to claim 3 wherein said intermediate frame and outer frame are formed of a synthetic resin.

* * * * *

UNITED STATES PATENT AND TRADEMARK OFFICE
CERTIFICATE OF CORRECTION

PATENT NO.    : 6,773,297 B2
DATED         : August 10, 2004
INVENTOR(S)   : Shoichiro Komiya It is certified that error appears in the above-identified patent and that said Letters Patent is hereby corrected as shown below:

Column 10,
Line 4, delete "claim 3".
Line 13, delete "claim 5".
Line 13, delete "claim 7".

Signed and Sealed this

Tenth Day of May, 2005

JON W. DUDAS
*Director of the United States Patent and Trademark Office*